P. PERSSON.
STEERING WHEEL LOCK.
APPLICATION FILED APR. 18, 1921.
1,411,508.
Patented Apr. 4, 1922.
3 SHEETS—SHEET 1.
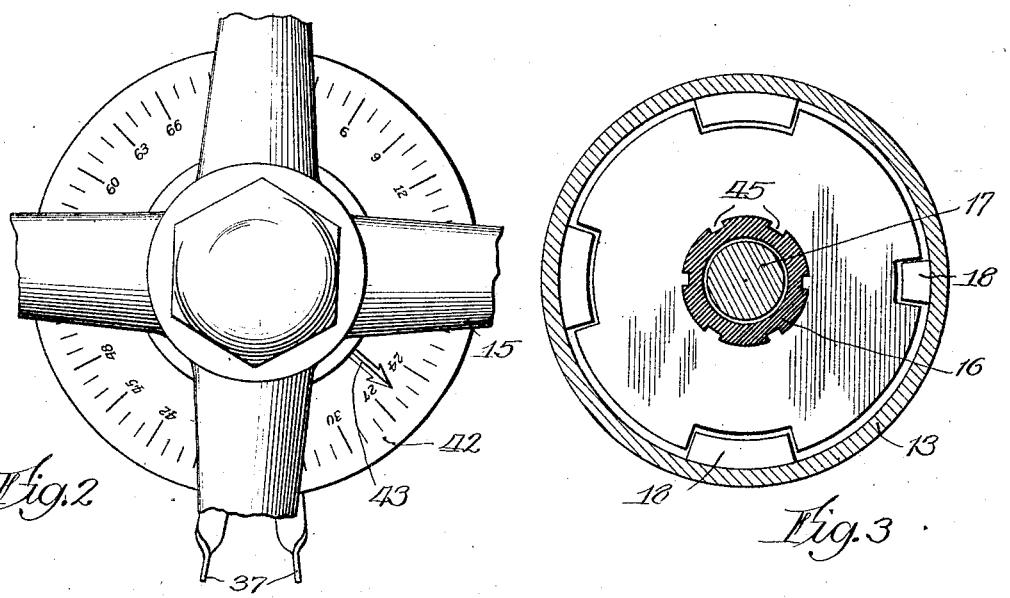
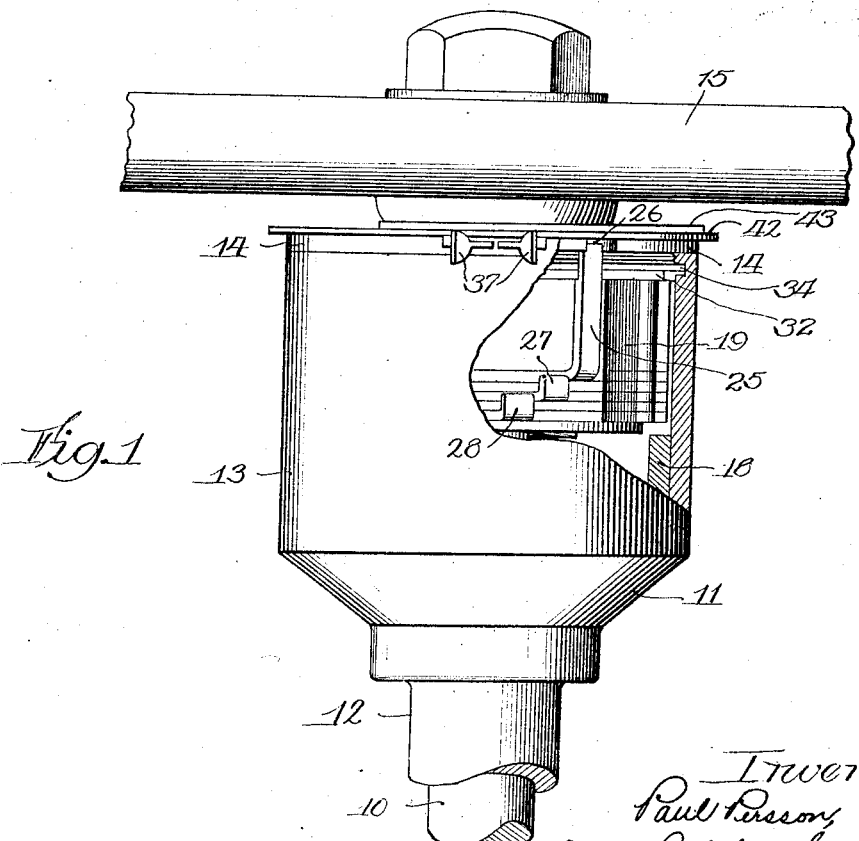

P. PERSSON.
STEERING WHEEL LOCK.
APPLICATION FILED APR. 18, 1921.
1,411,508.
Patented Apr. 4, 1922.
3 SHEETS—SHEET 2.
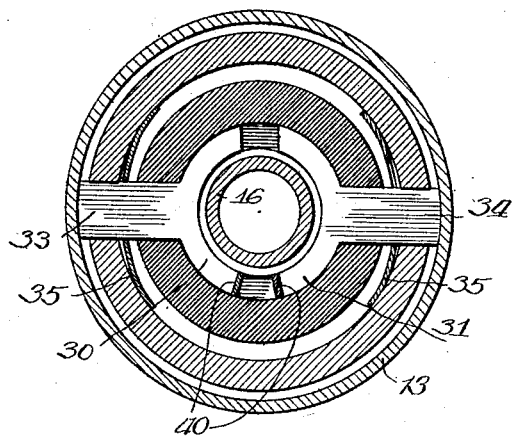
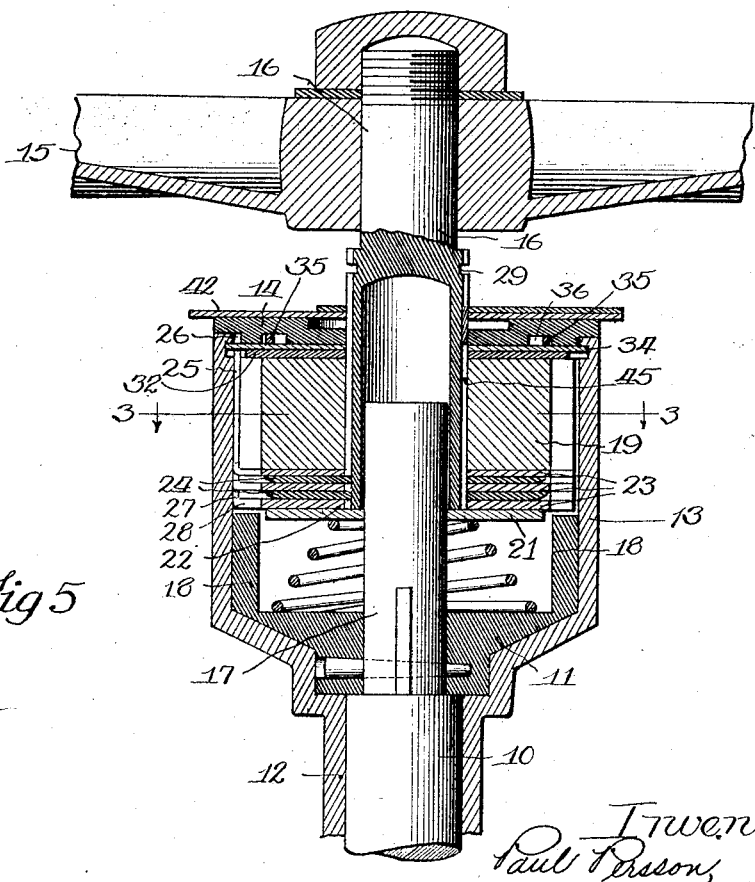
Inventor
Paul Persson,
By Bulkley & Swanarton Attys.

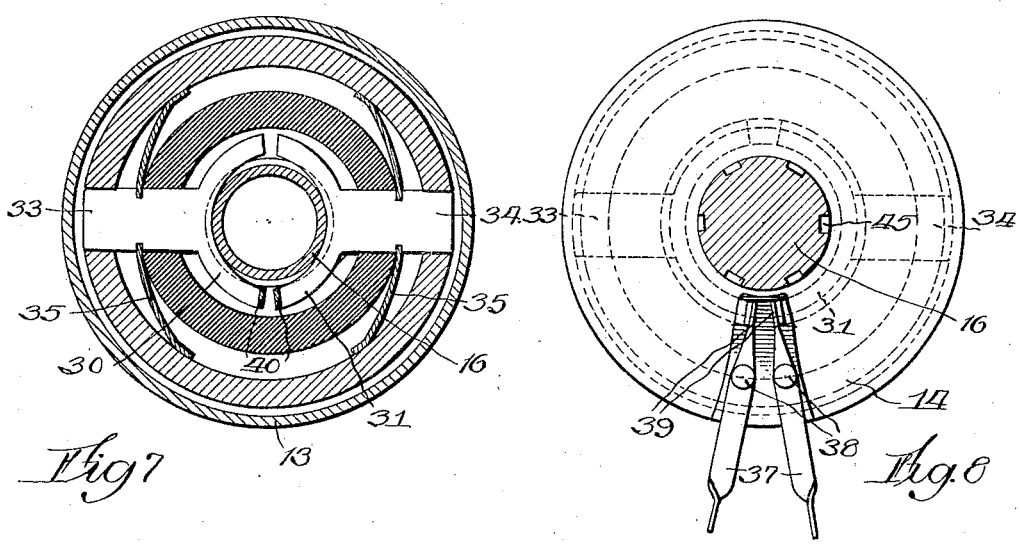
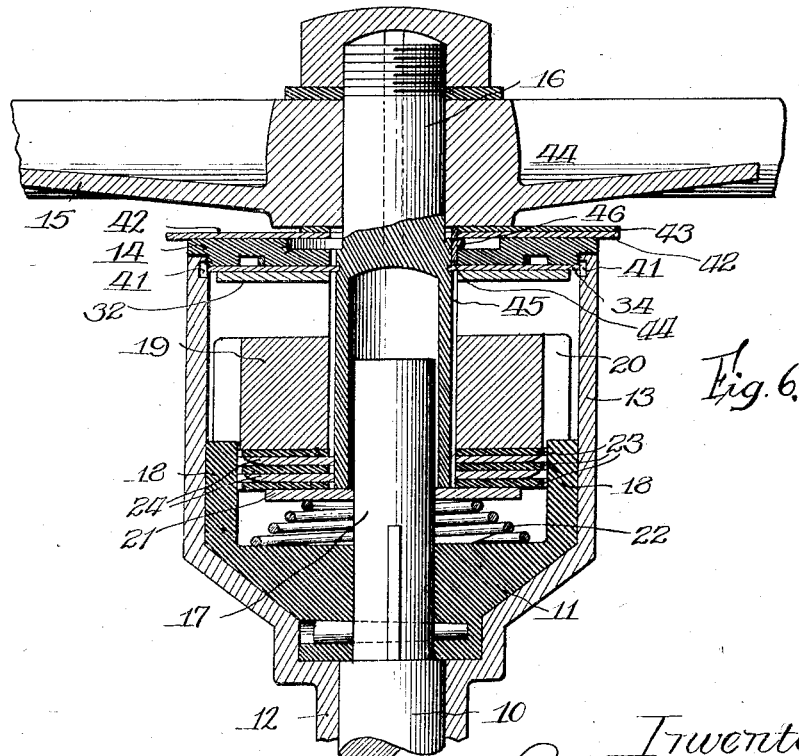

UNITED STATES PATENT OFFICE.

PAUL PERSSON, OF CHICAGO, ILLINOIS.

STEERING-WHEEL LOCK.

1,411,508.   Specification of Letters Patent.   Patented Apr. 4, 1922.

Application filed April 18, 1921. Serial No. 462,081.

*To all whom it may concern:*

Be it known that I, PAUL PERSSON, a citizen of the United States of America, and resident of Chicago, Cook County, Illinois, have invented a certain new and useful Improvement in Steering-Wheel Locks, of which the following is a specification.

My invention relates to an improvement in steering wheel locks—that is, of the type in which the steering wheel when in locked position is free to spin idly upon the steering post so that the car cannot be steered.

Among the features of my invention is the provision of a combination or keyless lock controlled by the rotation of the steering wheel for maintaining the steering wheel in inoperative relationship with the steering post and for enabling the steering wheel to be brought into operative relationship with the steering post.

These and other features and objects of my invention will be more readily understood by having reference to the accompanying drawings, in which I have illustrated one embodiment of my invention.

Figure 1 is a front elevation of the upper portion of a steering post with a portion of the housing broken away.

Fig. 2 is a plan view.

Fig. 3 is a transverse sectional view taken on the line 3—3 of Fig. 5.

Fig. 4 is a transverse sectional view showing the cap-locking mechanism in locked position.

Fig. 5 is a longitudinal sectional view showing the steering wheel in spinning or inoperative position.

Fig. 6 is a view similar to Fig. 5, but showing the steering wheel in locked engagement with the steering post.

Fig. 7 is a transverse sectional view similar to Fig. 4, but showing the cap-locking mechanism in inoperative position and the spring jaws in position to hold the steering wheel in lowered or operative position.

Fig. 8 is a plan view with the steering wheel and dial removed in order to more clearly show the controlling arms for the spring jaws.

As illustrated, the steering post 10 is provided at its upper end with an enlarged steering head 11. This steering post in enclosed in the usual column 12 which terminates in a cylindrical housing 13 which surrounds the steering head 11, and is closed by a screw-threaded cap 14. The steering wheel 15 is mounted upon a stub shaft 16, the lower end of which is hollow and fits over the reduced upper end 17 of the steering post 10. The inside periphery of the steering head 11 is provided with a plurality of inwardly extending projections or lugs 18 of varying widths, as clearly indicated in Fig. 3. The stub shaft 16 carries a cylindrical clutch member 19 provided on its periphery with a series of cut-out portions 20 which are adapted to co-operate with the projections or lugs 18 of the steering head. When the steering wheel is in lowered position, as indicated in Fig. 6, these lugs engage with the cut-out portions of the clutch member 19, thus forming an operative connection between the steering wheel and steering post. When the steering wheel, however, is in raised position, as indicated in Fig. 5, the clutch member 19 is raised to such an extent that it is out of engagement with the lugs 18. Therefore, there is no operative connection between the stub shaft 16 and the steering post 10 and the wheel is free to spin idly without imparting movement to the steering post.

Rigidly connected to the bottom of the stub shaft 16, there is a circular plate 21, and bearing against this plate and seated in the bottom of the steering head there is a spiral spring 22 which tends to raise the steering wheel and hold the same in inoperative or spinning position. In order to prevent the steering wheel being pressed downward into operative position, I provide a combination or keyless locking device which consists of a series of notched disks 23 which are frictionally held between the plate 21 and the lower surface of the clutch member 19 and are free to rotate with respect to the stub shaft 16. Between each pair of disks there is a circular friction washer 24 keyed to the stub shaft 16, which washers are flat on top but rounded on their bottom surface. Extending upwardly from the periphery of the upper or first disk 23 there is an arm or finger 25 which when the wheel is in raised position engages in a notch 26 in the cap 14. The second or intermediate disk 23 is provided with a finger 27 which projects upwardly into the path of the finger 25 while the lower or third disk 23 is provided with a finger 28 which projects upwardly into the path of the finger 27. With this arrangement it will be readily understood that by proper movement of the steering wheel the various disks 23 can be brought into such a position that the notches in these disks correspond with the notches in the locking member 19 and the notches in the steering head. Thus when the steering wheel is rotated the first or upper disk 23 will be held against movement due to the fact that the finger 25 is in engagement with the notch in the cap. The second and third disks will be carried with the clutch member 19 until further movement of these disks is prevented by reason of the finger 27 striking the finger 25 and the finger 28 of the lower disk striking the finger 27 of the second disk. Further rotation of the steering wheel then causes a relative movement between the lower or third disk and the clutch member 19 until the notches in this third disk correspond with the notches in the clutch member. The movement of the wheel is then reversed and the two lower disks move with the clutch member until the finger 27 of the second disk strikes the opposite side of the finger 25. Further movement of the wheel then produces a relative movement between the clutch member 19 and the second disk so that the notches in this second disk are brought into alinement with the notches in the clutch member. Upon movement of the wheel being reversed, the clutch member, carrying with it the second and third disks, moves relative to the first disk so that the notches in this first disk are brought opposite to the notches in the clutch member. The notches in the three disks and the clutch member are then in alinement so that by then pressing downwardly upon the steering wheel, this clutch member is brought into operative relation with the steering head. In order to hold the wheel in operative position, the stub shaft 16 is provided with a circular groove 29 with which a pair of spring jaws 30, 31, are adapted to engage. These spring jaws are mounted immediately below the cap 14 and are held against this cap by means of a plate 32 which is suitably connected to the cap. These spring jaws are provided with radially extending arms 33, 34, to which springs 35 are connected, which springs rest within a circular recess 36 in the cap. These springs tend to normally press inward on the spring jaws so that when the steering post is moved downward to bring the steering wheel into operative relationship with the steering post, and the slot 29 brought adjacent to these spring jaws, these jaws spring inward and securely hold the stub shaft and steering wheel in operative relationship with the steering post so that the car may be steered. In order to release the spring jaws from the notch to enable the wheel to again be raised, there is provided a pair of arms 37 which are pivoted at an intermediate point 38 to the cap 14 and are provided at their inner ends with downwardly extending fingers 39 which engage between a pair of upwardly extending lugs 40 on the spring jaw members 30, 31. With this construction, when the outer ends of the arms 37 are pressed together, the spring jaws are forced apart out of engagement with the circular notch or groove 29 so that the spring 22 forces the clutch member 19 upwardly out of operative relationship with the steering head so that the wheel is in locked or spinning position. By then giving the wheel a few turns back and forth, the notched disks 23 are scattered so that it is impossible to again move the steering wheel into operative relationship with the steering post until the combination disks have been properly operated.

In order to prevent the cap 14 from being unscrewed from the housing when the steering wheel is in spinning or locked position, there is provided a pair of notches or cut-out portions 41 into which the outer ends of the arms 33, 34, engage so as to prevent the cap from being unscrewed. Secured to the top of the cap is a dial plate 42 and mounted to rotate over this dial is a pointer 43 carried by a central ring which surrounds the stub shaft 16 and is provided with a downwardly extending tongue 44 which engages in a key-slot 45 in the stub shaft, this tongue being provided with a projection 46 which engages beneath the dial plate 42. With this construction the pointer 43 is free to rotate with the stub shaft and steering wheel but is held against longitudinal movement therewith. The stub shaft is provided with a series of key slots 45 and by causing the tongue 44 to engage in different ones of these slots the relative position of the pointer and steering wheel can be changed and thus the combination of the lock changed.

While I have illustrated and described certain specific embodiments of my invention, it will be understood that I do not wish to be limited to the exact construction shown and described, but that various changes and modifications may be made without departing from the spirit and intent of my invention.

What I claim as my invention is:

1. In steering mechanism, a steering post, a clutch member carried by the upper end of said post, a stub shaft, a steering wheel mounted thereon, a second clutch member mounted upon said stub shaft and adapted to engage with said first clutch member for operatively connecting together said steering wheel and said steering post, and a combination locking device controlled by movement of said steering wheel for preventing said second clutch member being engaged with said first clutch member whereby said steering wheel may be maintained in inoperative relationship with respect to said steering post.

2. In steering mechanism, a steering post, a steering head mounted thereon and provided with a plurality of upwardly extending lugs, a stub shaft telescoping over the end of said steering post, a clutch member carried by said stub shaft and provided with cut-out portions corresponding to said lugs, a steering wheel mounted upon said stub shaft, and a combination locking device mounted on said stub shaft for preventing said clutch member being brought into operative engagement with said steering head whereby said wheel is free to spin idly with respect to said steering post.

3. In steering mechanism, a steering post, a clutch member carried by the upper end of said post, a stub shaft telescoping over the end of said steering post and provided with a second clutch member adapted to engage with said first clutch member for operatively connecting said stub shaft and steering post, spring means normally tending to hold said clutch members in disengaged position, and means engaging with said stub shaft for holding said clutch members in engaged position against the tension of said first-mentioned spring means.

4. In steering mechanism, a steering post, a clutch member carried by the upper end of said post, a stub shaft telescoping over the end of said steering post and provided with a second clutch member adapted to engage with said first clutch member for operatively connecting said stub shaft and steering post, spring means normally tending to hold said clutch members in disengaged position, and means engaging with said stub shaft for holding said clutch members in engaged position against the tension of said first-mentioned spring means, and means for releasing said holding means to thereby permit said spring means to disengage said clutch members.

5. In steering mechanism, a steering post, a steering head carried thereby, a stub shaft telescoping over the end of said steering post, said stub shaft being provided with a clutch member for operatively connecting said stub shaft and steering post, a steering wheel carried by said stub shaft, spring means tending to normally raise said stub shaft to thereby hold said clutch member disengaged from said steering head, and a combination locking device carried by said steering post and operative through movement of said steering wheel for preventing said clutch member being brought into operative engagement with said steering head.

6. In steering mechanism, a steering post, a steering head carried thereby, a stub shaft telescoping over the end of said steering post, said stub shaft being provided with a clutch member for operatively connecting said stub shaft and steering post, a steering wheel carried by said stub shaft, spring means tending to normally raise said stub shaft to thereby hold said clutch member disengaged from said steering head, a combination locking device carried by said stub shaft and operative through movement of said steering wheel for preventing said clutch member being brought into operative engagement with said steering head, and a pair of jaws for engaging with a slot in said stub shaft for holding said clutch member in operative association with said steering head after said combination lock has been operated and the stub shaft forced downward against the tension of said spring means.

7. In steering mechanism, a steering post, a steering head carried thereby, a stub shaft provided with a clutch member for operatively connecting said stub shaft and steering post, a steering wheel carried by said stub shaft, spring means tending to normally raise said stub shaft to thereby hold said clutch member disengaged from said steering head, a combination locking device carried by said stub shaft, and operative through movement of said steering wheel for preventing said clutch member being brought into operative engagement with said steering head, a pair of jaws for engaging with a slot in said stub shaft for holding said clutch member in operative association with said steering head after said combination lock has been operated and the stub shaft forced downward against the tension of said spring means, and means for releasing said holding means to permit said clutch member being again operatively disconnected from said steering head.

8. In steering mechanism, a steering post, a steering head carried thereon, a stub shaft carrying a clutch member and adapted to be engaged by said steering head for operatively connecting said stub shaft with said steering post, a steering wheel mounted upon said stub shaft, spring means normally tending to hold said clutch member in inoperative relationship with said steering head, a housing enclosing said steering head and clutch member, a cap for said housing, and means for locking said cap to said housing when said clutch member is in inoperative relationship with said steering head.

9. In steering mechanism, a steering post, a steering head carried thereon, a stub shaft carrying a clutch member and adapted to be engaged by said steering head for operatively connecting said stub shaft with said steering post, a steering wheel mounted upon said stub shaft, spring means normally tending to hold said clutch member in inoperative relationship with said steering head, a housing enclosing said steering head and clutch member, a cap for said housing, a pair of spring jaws for holding said clutch member in engagement with said steering head against the tension of said spring means, and means controlled by said spring jaws when said clutch member is in inoperative relationship with said steering head for locking said cap to said housing.

Signed by me at Chicago, Illinois, this 6th day of April, 1921.

PAUL PERSSON,